US010673707B2

(12) United States Patent
Dhanabalan et al.

(10) Patent No.: US 10,673,707 B2
(45) Date of Patent: Jun. 2, 2020

(54) SYSTEMS AND METHODS FOR MANAGING LIFECYCLE AND REDUCING POWER CONSUMPTION BY LEARNING AN IOT DEVICE

(71) Applicant: Citrix Systems, Inc., Fort Lauderdale, FL (US)

(72) Inventors: Praveen R. Dhanabalan, Bangalore (IN); Anup L. Gupta, Bangalore (IN); Akshata Bhat, Bangalore (IN); James Bulpin, Cambridge (GB); Jaskirat Chauhan, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 16 days.

(21) Appl. No.: 15/973,202

(22) Filed: May 7, 2018

(65) Prior Publication Data
US 2019/0342182 A1 Nov. 7, 2019

(51) Int. Cl.
*G06F 1/3234* (2019.01)
*G06F 8/65* (2018.01)
*H04L 12/24* (2006.01)
*G06N 20/00* (2019.01)

(52) U.S. Cl.
CPC .......... *H04L 41/147* (2013.01); *G06F 1/3234* (2013.01); *G06F 8/65* (2013.01); *H04L 41/142* (2013.01); *G06N 20/00* (2019.01)

(58) Field of Classification Search
None
See application file for complete search history.

(56) References Cited

U.S. PATENT DOCUMENTS

| 9,063,818 B1* | 6/2015 | Risbood | G06F 8/65 |
| 2016/0170747 A1* | 6/2016 | Luettge | G06F 8/656 |
| | | | 717/121 |
| 2016/0197769 A1* | 7/2016 | Britt | H04L 41/0681 |
| | | | 709/223 |
| 2017/0329597 A1* | 11/2017 | Harmon | G06F 8/65 |

* cited by examiner

*Primary Examiner* — Clayton R Williams
*Assistant Examiner* — Christopher B Robinson
(74) *Attorney, Agent, or Firm* — Fox Rothschild LLP; Robert J. Sacco; Carol E. Thorstad-Forsyth

(57) ABSTRACT

The present disclosure discloses a system that automatically identifies the most efficient times to upgrade software associated with an IoT device. The system employs machine-learning mechanisms to precisely identify the specific time interval where there will be the least impact on the functionality of the IoT device or a cluster of IoT devices.

16 Claims, 4 Drawing Sheets

SYSTEMS AND METHODS FOR MANAGING LIFECYCLE AND REDUCING POWER CONSUMPTION BY LEARNING AN IOT DEVICE

TECHNICAL FIELD

Aspects of the present disclosure relate to cloud computing networks, and in particular, to cloud computing environments enabling the execution of scripts and/or workflows.

BACKGROUND

Internet of Things ("IoT") devices typically require software in order to interact with other devices, store and manipulate data, and to function as designed. If the software of an IoT device is deficient or otherwise corrupted, then the IoT device may not be able operate. Thus, the software associated with such IoT devices is often upgraded and/or modified to ensure that the IoT device using the software is functioning properly.

In a typical arrangement, the software of an IoT device may be upgraded from a single point, such as when the load/data transfer on the IoT device is low or when the IoT device has high availability, so that there is the least amount of impact on the functionality of the IoT device during the software upgrade. With IoT devices, however, it is common that the devices would be continuously sending or streaming data (e.g., sending data per second). Upgrading IoT devices that continually stream data may present challenges.

It is with these problems, among others, that aspects of the present disclosure where conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve a system that automatically determines or otherwise identifies the most efficient (e.g., most optimal) times to upgrade software associated with an IoT device. In various aspects, the disclosed system employs machine-learning algorithm(s) and related mechanisms to identify a specific time interval where there will be the least impact on the functionality of the IoT device.

In one specific example, IoT devices may continuously send or stream data (e.g., sending sensor data per second) to requesting devices, such as client devices. For example, consider the example where a refrigerator sends data and information (e.g., temperature and energy consumption data) to a user's smart phone (i.e., a client device). In such a scenario, upgrading the IoT devices that continually stream data may be a challenge, as it becomes harder to update such devices without causing an impact on the functionality of the particular IoT device. For example, taking a particular IoT device down for software upgrades may either functionally impact the device or the device may be unable to send critical data points.

Additionally, in another embodiment, in a scenario where there are a massive number of IoT devices sending data, the total power consumption may be high. Power consumption may be a critical issue when an IoT device is driven by a limited energy sources, such as a battery. Thus, the disclosed system may also cause an IoT device to be put in stand-by mode during identified specific time intervals. The disclosed system automatically determines or otherwise identifies the specific time period.

The present application solves these specific technical problems, among others, by providing a mechanism that automatically identifies specific time intervals during which data sensed by a particular IoT device is constant or predictable. During such instances, the device may be put into stand-by mode such that the amount of power consumed for data transfer could be reduced. Additionally, during such time any software associated with the IoT device(s) may be automatically upgraded.

Figure 1:
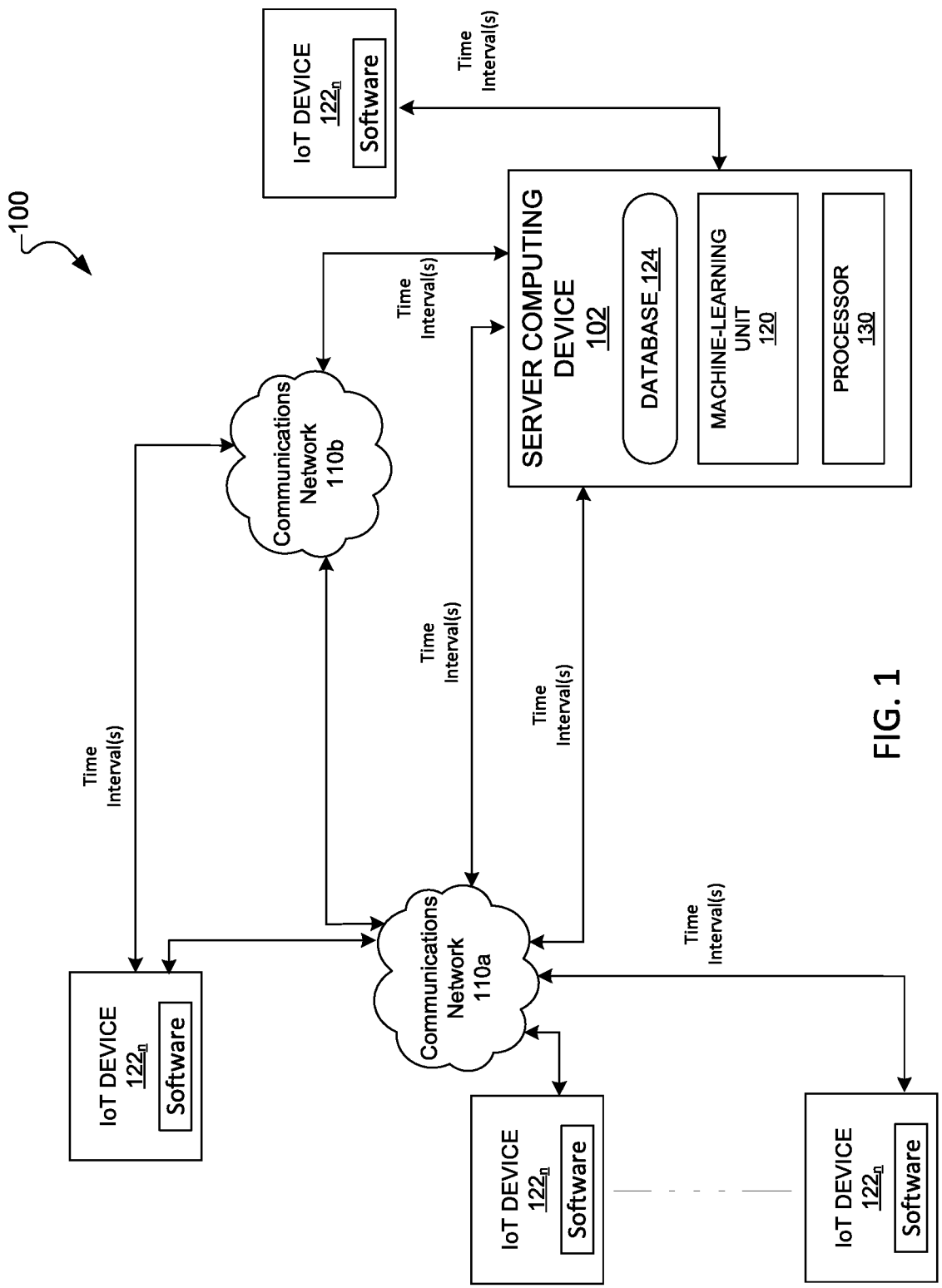
FIG. 1 is an example computing environment for upgrading software of IoT devices, according to aspects of the present disclosure.

FIG. 1 provides and illustration of an implementation of a computing system or architecture 100 that identifies specific times for upgrading IoT devices, according to aspects of the present disclosure. As illustrated, FIG. 1 includes various computing devices communicating through one or more networks 110$a$, 110$b$. The one or more networks may be an IP-based telecommunications network, the Internet, an intranet, a local area network, a wireless local network, a content distribution network, or any other type of communications network, as well as combinations of networks. For example, in one particular embodiment, the networks 110$a$ and 110$b$ may be a telecommunications network including fiber-optic paths between various network elements, such as servers, switches, routers, and/or other optical telecommunications network devices that interconnect to enable receiving and transmitting of information between the various elements as well as users of the network.

The computing environment 100 includes a server computing device 102 that is in communication with IoT devices ($122_1$, $122_2$, ..., $122_n$) located at one or more geographic locations. The server computing device 102, may be a processing device that functionally connects or otherwise communicates (e.g., using the one or more networks 110$a$, 100$b$) with IoT devices ($122_1$, $122_2$, ..., $122_n$) included within the computing environment 100. The IoT devices ($122_1$, $122_2$, ..., $122_n$) may be any of, or any combination of, a personal computer; handheld computer; mobile phone; digital assistant; smart phone; server; application; smart home device(s), wearable device(s), connected car device(s), smart city devise, and/or the like. In one embodiment, each of the IoT devices ($122_1$, $122_2$, ..., $122_n$) may include a processor-based platform that operates on any suitable operating system, such as Microsoft® Windows®, Linux®, Android, and/or the like that is capable of executing software processes, software, applications, etc. The IoT devices ($122_1$, $122_2$, ..., $122_n$) devices may also include a communication system to communicate with the various components of the computing environment 100 via a wireline and/or wireless communications, such as networks 110a, 100b.

The server computing device 102 includes a database 124, a machine-learning unit 120, and a processor 130. The machine-learning unit 120 executes various machine-learning algorithms to identify specific time intervals that represent the best time during which software of an IoT device or cluster of IoT devices should/may be upgraded. The database 124 may be a database, data store, storage and/or the like, for storing data involved in the identification of time intervals for updating software of IoT devices. In one specific example, the database 120 may store predictions of time intervals for updating one or more of the IoT devices ($122_1$, $122_2$, ..., $122_n$), generated by the machine-learning unit 120.

Figure 2:
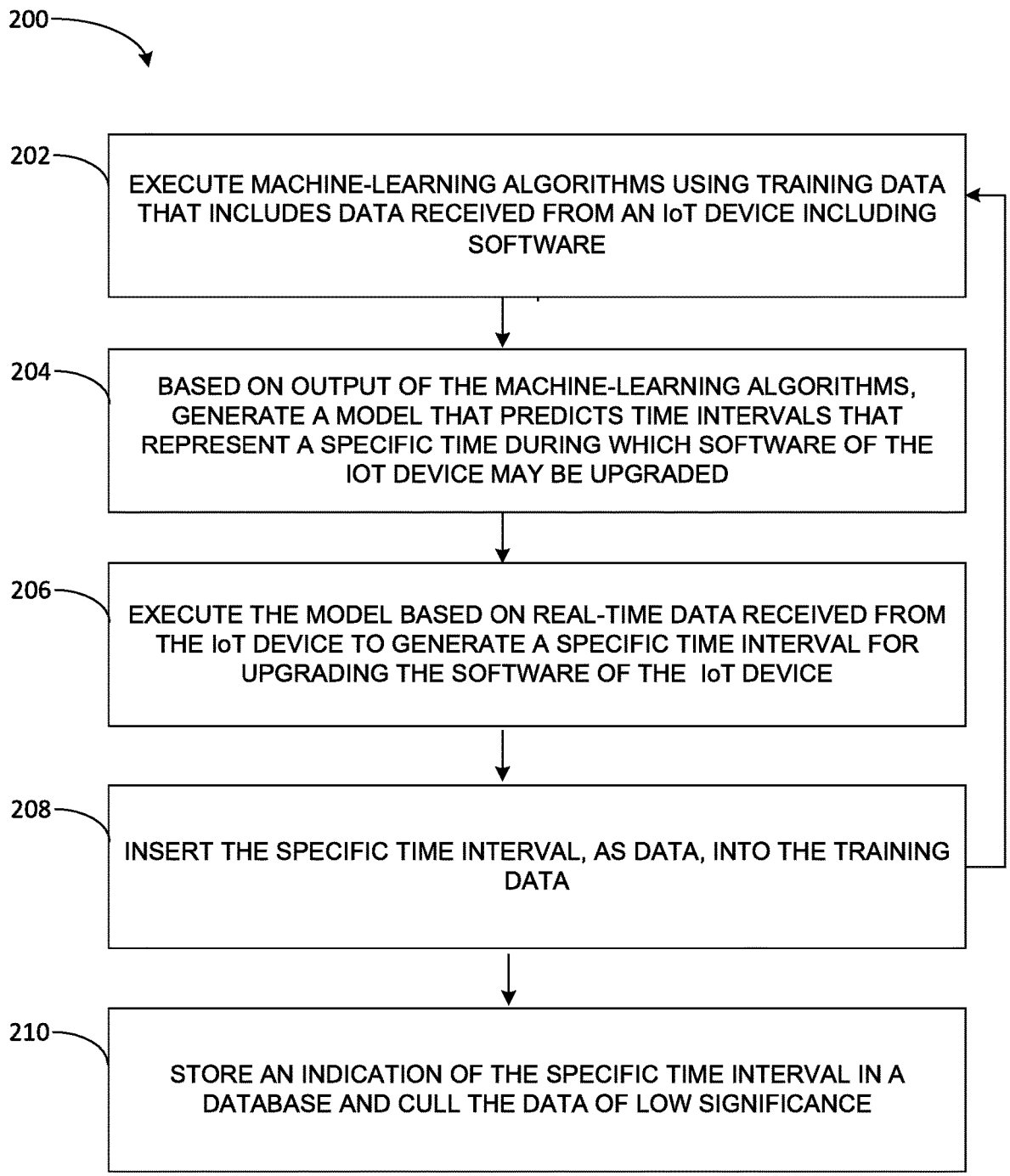
FIG. 2 is flow chart for upgrading software of IoT devices, according to aspects of the present disclosure.

Referring now to FIG. 2 and with reference to FIG. 1, a process 200 for identifying specific time intervals that represent the best time during which software of an IoT device or cluster of IoT devices should/may be upgraded is provided. Stated differently, the process 200 identifies the time period where there will be at least possible impact on the functionality of a given IoT device (e.g., IoT devices ($122_1$, $122_2$, ..., $122_n$)). The IoT devices can be clustered based on type of data transferred by the IoT devices, the geo-location of the IoT devices, etc. Tuned and customized versions of k-means clustering can be implemented to achieve this. Moreover, given the plethora of IoT devices, upgrading them one-by-one may not be technically feasible. In such a scenario, the admin can benefit from upgrading a cluster of similar devices at a single time. Also, a single machine-learning model can be used per cluster instead of per device.

Referring now to process 200, as illustrated, process 200 begins at step 202, with executing one or more machine-learning algorithms to training data that includes data received from an IoT device, wherein the IoT device contains upgradable software. For example, the data may include data from various sensors associated with the IoT Device.

In some instances, the training data may include one or more independent variables or parameters, when associated, identify a specific time for updating software of IoT devices in the cluster. In some embodiments, similar devices, will have similar feature set. For example, a room sensor may be sensing temperature and humidity. A refrigerator van may be sending location, humidity and temperature, vehicle speeds, etc. A multi-variable time-series regression model may be used for prediction, for each cluster. More specifically, the model(s) identify the pattern in data sent by the devices. The system looks for consistent data patterns to trigger case 1 or consistent change in data for case 2. The system relies on admin feedback for correcting the model.

Stated differently, the training data may include an extremely large (not human processable) data set of call conversion data collected over several years and/or based on hundreds of thousands of calls. The training data may further include validation data that identifies prior outcomes (e.g., valid routed call center agents) for such variables. Example machine-learning techniques that may be applied include linear regression, non-linear regression, Bayesian modeling, Monte Carlos methods, neural networks, random forest, k-means clustering, among others.

In one specific example, the machine-learning mechanism may generate correlations between a set of independent variables of the data received from the IoT devices (e.g., pre-determined or automatically identified) and an appropriate time intervals for upgrading an IoT device, for example using linear regressions. Alternatively, a multi-variable time-series regression technique may be used. Thus, at 204, the system generates a set of algorithm constants, which when applied to a real-time set of data obtained from one or more of the IoT devices ($122_1$, $122_2$, ..., $122_n$), automatically generates a model that predicts specific time intervals that represent the best time during which software of an IoT device or cluster of IoT devices should/may be upgraded.

Referring again to FIG. 2, at 206, the generated model is executed, based on real-time data received from an IoT device, to automatically predict specific time intervals that represent the best time during which software of the IoT device or the cluster of IoT devices should/may be upgraded. Referring to FIG. 1, on identifying the time interval, the server computing device 102 notifies the applicable IoT device to perform the software upgrade. After the upgrade, if the predicted value and the sensed value are same, it implies that the upgrade prediction time is good.

At 208, in some instances, the results (i.e., the predicted time intervals) from executing the generated model(s) are automatically fed back into the training data to thereby further refine the prediction capability of the server computing device 102. For example, new predictions specific time intervals that represent the best time during which software of an IoT device or cluster of IoT devices should/may be upgraded may be generated and used to upgrage IoT devices. And the new time interval prediction may be fed back into or otherwise aggregated into the training data of step 202. Then, the training process (step 202) may be repeated and thereby incorporate the newly predicted or otherwise identified time intervals that represent the best time during which software of an IoT device or cluster of IoT devices should/may be upgraded. In some instances, new classification mechanisms and/or correlations may be identified and incorporated into any newly generated models, in view of the supplemented training data. The updated and/or newly generated models may be integrated into the machine-learning unit 120 logic of the server computing device 102 and utilized for further predictions of time intervals that represent the best time during which software of an IoT device or cluster of IoT devices should/may be upgraded may be generated and used.

Figure 3:
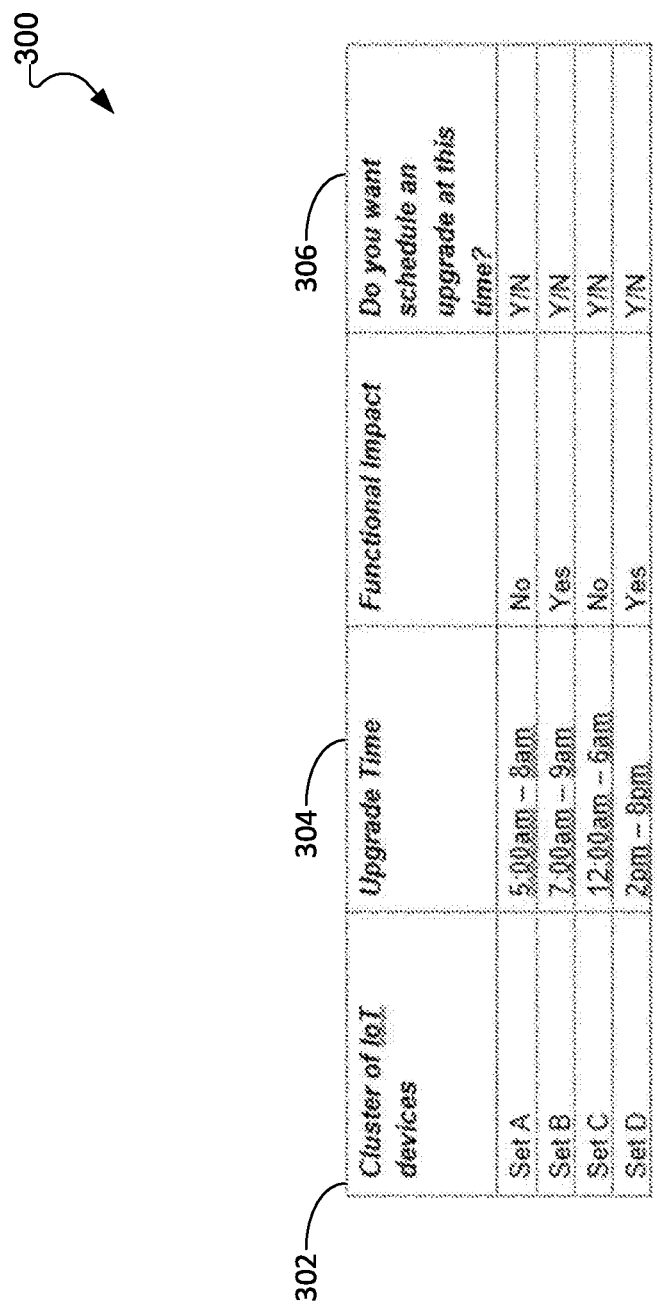
FIG. 3 is an example interface, according to aspects of the present disclosure.

In another specific example, the server computing device 102 may receive feedback from a user indicating that the predicted specific time interval is an acceptable interval for upgrading software. More specifically, the server computing device 102 may generate a graphical user-interface for display to a user that (e.g., at a IoT device or other client device) visualizes the various IoT devices and clusters capable of upgrade. In such a scenario, the graphical user-interface may include selectable components that enable the user to indicate whether the user will upgrade the applicable IoT device during the predicted time period. FIG. 3 illustrates and example of an interface 300, according to one embodiment. As illustrated, the graphical user-interface 300 includes an indication of the IoT devices (or cluster of IoT devices) 302 associated with a specific time interval 304 and a selectable component 306 enabling a user to indicate whether the will upgrade the IoT device during the specified time interval. Thus, when a user indicates that he/she will upgrade the software during the specified time, the system may automatically cause the specified time interval to be included in the training data of step 202. Alternatively, when a user does not indicate that he/she will upgrade the software during the specified time, the system may not automatically cause the specified time interval to be included in the training data of step 202.

Referring again to FIG. 2, the processed training data and generated predictions are stored (and continuously stored) into the database 220. At 210, in some instances, the stored training data and predictions maybe pruned of data that is of low significance. More specifically, some call route determinations may be included within the training dataset, which have not been observed a sufficient number of times to have statistically significant outcome association. In such instances, it may be desirable to prune those call routes of low significance, such as by removing from the call routes from the larger training dataset and thereby keep the removed data from impacting newly generate call routes.

Three examples for use in upgrading the software of an IoT device will now be provided.

Case 1: When Data is Consistent

Consider a refrigerator that senses variation in temperature when people open and close a refrigerator. The temperature may remain constant when no one is using the refrigerator. Hence the time when temperature remains constant may be the appropriate time to upgrade or switch to stand-by mode. In another example, an IoT device on a door may sense door is closed/opened frequently. When no one is in office the door may remain closed hence such a time might be the appropriate time to upgrade the device. The system uses the feedback-based learning mechanism described above to predict the time interval when the data transferred by the device is consistent. To increase the confidence of the predicted upgrade time, the system uses the following logic:

Case 2: When the Change in Data is Consistent

Consider, for example a temperature sensor in office would sense temperature to be changing + or −2 Fahrenheit in the working hours and consistently drops or increase in non-working hours as the air-coolants may be off. The rate of change of temperature would be consistent in non-working hours as the rate of drop in temperature or rate of increase in temperature would be same. Hence the upgrade point is the time when the temperature drops or increases consistently. The system uses a similar feedback-based mechanism as used in case 1. In the current case, the algorithm will predict the time interval where the rate of change in data is consistent, during which the upgrade can be performed or the device can be switched to stand-by mode. If the client is in stand-by mode and it detects that the rate is inconsistent, it will start sending data to the central processing device again.

Case 3: When the Rate of Change in Data is Inconsistent

Consider a burglary alarm system that may have consistent data with consistent rate of change of data at nighttime, as the camera attached to the burglary system doesn't experience movement of objects. But it will have variable data at daytime, as object movement is common in daytime. In this case, the system would determine a false positive, this way our algorithm will learn to identify upgrade time interval for such devices with a different logic where the rate of change of data is inconsistent. For handling false positives and false negatives in this case, the workflow of the upgrade process would be: the system finds groups of IoT devices to the upgraded at various points; This information is given to the admin to validate it. If admin says yes we can proceed, if he says no, we retrain our model, with a heavy weightage to the user feedback, to suggest an alternate time. After we provide the optimal time of update, the admin can reject this and input optimal time. The algorithm will take this feedback to improve its accuracy.

When the algorithm predicts constant data, the broker notifies the client to switch to stand-by mode, which in turn, results in reduction of power by the IoT device(s). Additionally, in this mode, the client will not transfer data to broker, but it will regularly check if any variation in the data-sensed. On identifying a variation, the client will start sending data to the broker again. The broker/gateway will use this, to validate the prediction.

Figure 4:
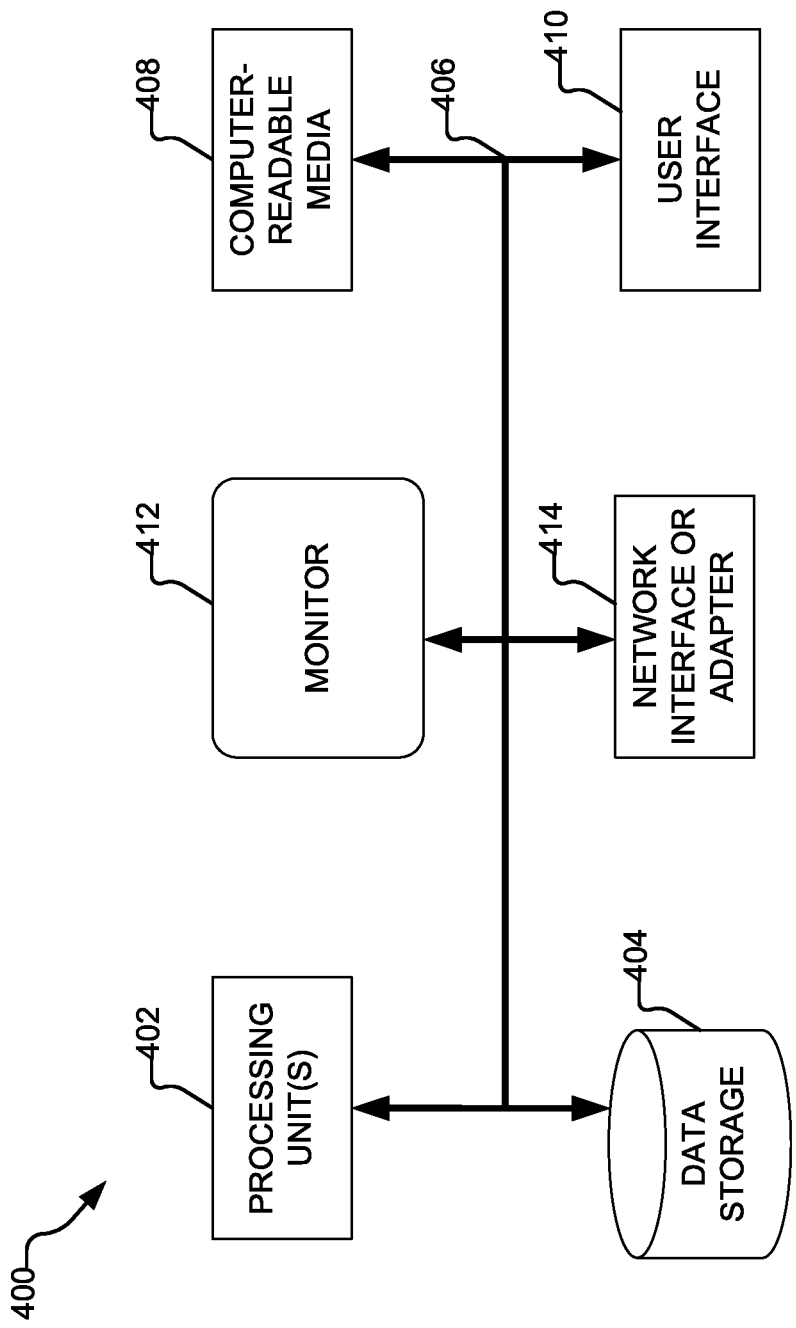
FIG. 4 is a diagram of a computing system specifically implemented for upgrading software of IoT devices, according to aspects of the present disclosure, according to aspects of the present disclosure.

FIG. 4 illustrates an example of a suitable computing and networking environment 400 that may be used to implement various aspects of the present disclosure described in FIG. 1-4. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other media that may be used to store the desired information/data and which may be accessed by the computer 400.

Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method comprising:
obtaining, using a computing device, first data from at least one Internet of Things ("IoT") device of a plurality of IoT devices included in a distributed network, each said IoT device of the plurality of IoT devices comprising software;
generating, using the computing device, a machine learned model that specifies at least one consistent pattern or consistent change in the first data obtained from the at least one IoT device of the plurality of IoT devices;
receiving, from the at least one IoT device, second data comprising sensor data indicating at least one measured physical property by an internal sensor of the at least one IoT device;
using the machine learned model and the second data to predict time intervals during which sensed data associated with the at least one IoT device will be constant or predictable;
identifying a specific time interval from the predicted time intervals during which a software upgrade would result in a least possible impact on a functionality of the at least one IoT device; and
receiving an indication that the at least one IoT device will be upgraded during the specific time interval.

2. The method of claim 1, further comprising upgrading the software of the at least one IoT device during the specific time interval.

3. The method of claim 1, further comprising:
identifying, using the computing device, a cluster of IoT devices from the plurality of IoT devices;
identifying the at least one IoT device from the cluster of IoT devices.

4. The method of claim 1, further comprising generating a graphical user-interface including a selectable component for receiving the indication that the specific time interval will be used to upgrade the software of the at least one IoT device.

5. The method of claim 1, wherein the at least one IoT device is at least one of a refrigerator, a temperature sensor, and a burglar alarm device.

6. A system comprising:
at least one computing device to:
obtain first data from at least one Internet of Things ("IoT") device of a plurality of IoT devices included in a distributed network, each said IoT device of the plurality of IoT devices comprising software;

generate a machine learned model that specifies at least one consistent pattern or consistent change in the first data obtained from the at least one IoT device of the plurality of IoT devices;

receive, from the at least one IoT device, second data comprising sensor data indicating at least one measured physical property by an internal sensor of the at least one IoT device;

use the machine learned model and the second data to predict time intervals during which sensed data associated with the at least one IoT device will be constant or predictable;

identify a specific time interval from the predicted time intervals during which a software upgrade would result in at least one possible impact on functionality of the at least one IoT device; and receive an indication that the at least one IoT device will be upgraded during the predicted time interval.

7. The system of claim 6, further comprising upgrading the software of the at least one IoT device during the specific time interval.

8. The system of claim 6, wherein the at least one computing device is further configured to identify a cluster of IoT devices from the plurality of IoT devices, and identify the at least one IoT device from the cluster of IoT devices.

9. The system of claim 6, wherein the at least one computing device is further configured to generate a graphical user-interface including a selectable component for receiving the indication that the specific time interval will be used to upgrade the software of the at least one IoT device.

10. The system of claim 6, wherein the at least one IoT device is at least one of a refrigerator, a temperature sensor, and a burglar alarm device.

11. A non-transitory computer readable medium encoded with instructions, the instructions executable by a computing device, comprising:

obtaining first data from at least one Internet of Things ("IoT") device of a plurality of IoT devices included in a distributed network, each said IoT device of the plurality of IoT devices comprising software;

generating a machine trained model that specifies at least one consistent pattern or consistent change in the first data obtained from the at least one IoT device of the plurality of IoT devices;

receiving, from the at least one IoT device, second data comprising sensor data indicating at least one measured physical property by an internal sensor of the at least one IoT device;

using the machine trained model and the second data to predict time intervals during which sensed data associated with the at least one IoT device will be constant or predictable;

identifying a specific time interval from the predicted time intervals during which a software upgrade would result in at least possible impact on a functionality of the at least one IoT device; and receiving an indication that the at least one IoT device will be upgraded during the specific time interval.

12. The non-transitory computer readable medium of claim 11, further comprising upgrading the software of the at least one IoT device during the specific time interval.

13. The non-transitory computer readable medium of claim 11, further comprising:

identifying, using the computing device, a cluster of IoT devices from the plurality of IoT devices and identifying the at least one IoT device from the cluster of IoT devices.

14. The non-transitory computer readable medium of claim 11, further comprising generating a graphical user-interface including a selectable component for receiving the indication that the specific time interval will be used to upgrade the software of the at least one IoT device.

15. The non-transitory computer readable medium of claim 11, wherein the at least one IoT device is at least one of a refrigerator, a temperature sensor, and a burglar alarm device.

16. The non-transitory computer readable medium of claim 11, wherein the at least one IoT device is in a stand-by-mode, causing the at least one IoT device to consume less power than when the at least one IoT device is not in stand-by-mode.

* * * * *